United States Patent
Hudson et al.

(10) Patent No.: US 12,217,050 B2
(45) Date of Patent: Feb. 4, 2025

(54) METHOD AND SYSTEM FOR IDENTIFYING SUSPICIOUS CODE CONTRIBUTION TO A SOURCE CODE REPOSITORY

(71) Applicant: HCL America, Inc, Sunnyvale, CA (US)

(72) Inventors: Michael Hudson, Delray Beach, FL (US); Michael Florio, Lake Worth, FL (US); Sunil Dandamudi, Cary, NC (US); Samuel Dwumfour, Newark, NJ (US)

(73) Assignee: HCL America Inc.

( * ) Notice: Subject to any disclaimer, the term of this patent is extended or adjusted under 35 U.S.C. 154(b) by 589 days.

(21) Appl. No.: 17/503,803

(22) Filed: Oct. 18, 2021

(65) Prior Publication Data
US 2023/0124113 A1    Apr. 20, 2023

(51) Int. Cl.
*G06F 8/75*    (2018.01)
*G06F 8/71*    (2018.01)
(Continued)

(52) U.S. Cl.
CPC .................. *G06F 8/75* (2013.01); *G06F 8/71* (2013.01); *G06F 11/3438* (2013.01); *G06F 21/554* (2013.01); *G06F 21/566* (2013.01)

(58) Field of Classification Search
CPC .......... G06F 8/75; G06F 8/71; G06F 11/3438; G06F 21/554; G06F 21/566;
(Continued)

(56) References Cited

U.S. PATENT DOCUMENTS

| 7,568,229 B1 * | 7/2009 | Nachenberg | G06F 21/554 |
| | | | 707/999.009 |
| 9,172,720 B2 * | 10/2015 | Foley | H04L 63/145 |

(Continued)

FOREIGN PATENT DOCUMENTS

KR    20200125159 A    11/2020

OTHER PUBLICATIONS

Batyuk, Leonid, et al. "Using static analysis for automatic assessment and mitigation of unwanted and malicious activities within Android applications." 2011 6th International Conference on Malicious and Unwanted Software. IEEE, 2011. (Year: 2011).*

(Continued)

*Primary Examiner* — Jung W Kim
*Assistant Examiner* — Sameera Wickramasuriya
(74) *Attorney, Agent, or Firm* — Kendal M. Sheets

(57) ABSTRACT

This disclosure relates to method and system for identifying suspicious code contribution of a user to a source code repository. The method includes receiving a plurality of updated code files of a source code repository from a user through an event. The method further includes extracting a plurality of user action parameters from the event corresponding to each of the plurality of updated code files. The method further includes storing the plurality of updated code files and the plurality of user action parameters from the event corresponding to each of the plurality of updated code files in a database. The method further includes identifying at least one of the set of user actions as a suspicious code contribution of the user for at least one of the plurality of updated code files of the source code based on the plurality of user action parameters.

17 Claims, 6 Drawing Sheets

(51) Int. Cl.
*G06F 11/34* (2006.01)
*G06F 21/55* (2013.01)
*G06F 21/56* (2013.01)

(58) Field of Classification Search
CPC ............ G06F 2221/033; G06F 21/577; G06F 9/44505; G06F 21/564; G06F 21/51; G06F 21/552
See application file for complete search history.

(56) References Cited

U.S. PATENT DOCUMENTS

| | | | |
|---|---|---|---|
| 9,836,617 | B2 | 12/2017 | Cecchetti et al. |
| 10,489,270 | B2* | 11/2019 | Cheng ........................ G06F 8/75 |
| 10,534,918 | B1* | 1/2020 | Davidi ................... G06F 21/577 |
| 10,802,823 | B2* | 10/2020 | Tornhill ..................... G06F 8/71 |
| 11,483,322 | B1* | 10/2022 | Walther .............. H04L 63/1416 |
| 2004/0030912 | A1 | 2/2004 | Merkle et al. |
| 2011/0239306 | A1 | 9/2011 | Avni et al. |
| 2011/0283356 | A1* | 11/2011 | Fly ........................ G06F 21/577<br>726/22 |
| 2013/0167120 | A1* | 6/2013 | Amano ...................... G06F 8/71<br>717/122 |
| 2014/0033176 | A1* | 1/2014 | Rama ................... G06F 11/3688<br>717/124 |
| 2015/0067861 | A1* | 3/2015 | Foley .................. H04L 63/1425<br>726/24 |
| 2019/0294432 | A1* | 9/2019 | Tornhill ................ G06F 21/577 |
| 2020/0005219 | A1* | 1/2020 | Stevens ..................... G06F 8/71 |
| 2020/0379879 | A1 | 12/2020 | Plotnik et al. |
| 2021/0006542 | A1* | 1/2021 | Myneni ................... H04L 63/20 |
| 2021/0256142 | A1* | 8/2021 | Linga ........................ G06F 8/70 |
| 2021/0357310 | A1* | 11/2021 | Blouvshtein .......... G06F 11/302 |

OTHER PUBLICATIONS

Z. Wu, X. Chen, Z. Yang and X. Du, "Reducing Security Risks of Suspicious Data and Codes Through a Novel Dynamic Defense Model," in IEEE Transactions on Information Forensics and Security, vol. 14, No. 9, pp. 2427-2440, Sep. 2019 (Year: 2019).*

Danielle Gonzalez, "Anomalicious: Automated Detection of Anomalous and Potentially Malicious Commits on GitHub"

* cited by examiner

METHOD AND SYSTEM FOR IDENTIFYING SUSPICIOUS CODE CONTRIBUTION TO A SOURCE CODE REPOSITORY

TECHNICAL FIELD

This disclosure relates generally to software source code management, and more particularly to method and system for identifying suspicious code contribution of a user to a source code repository.

BACKGROUND

A code project may include a wide range of contributions from internal and external contributors over a long duration of time. Typically, external contributors have some level of trust ranging from high (commercially licensed code that happens to be delivered in source form) to low (publicly available open source).

Internal contributors, on the other hand, are generally considered to be more trustworthy since software development tools and processes generally employ security measures to filter safe code contributions from malicious code contributions. For example, code contributed to a project by an employee who has signed into an organization network (either from a physical network connection from office, or through a VPN from home) and checked the code into a secure source code repository is generally deemed to be trustworthy.

However, such methods are based on trust and may lead to human bias. State of the art devOps pipelines first review the code (internally and sometimes externally contributed) and then scan for known vulnerabilities prior to building the code. However, reviewing code is time consuming, prone to human error, and requires manual effort. Moreover, scanning code for known vulnerabilities may skip potentially malicious code which may not be classified as a 'known vulnerability' by the system.

The conventional techniques fail to provide for scanning potentially malicious code contributions by trusted developers. There is, therefore, a need in the present state of art for techniques to identify suspicious code contributions by developers in real-time.

SUMMARY

In one embodiment, a method for identifying suspicious code contribution of a user to a source code repository is disclosed. In one example, the method includes receiving a plurality of updated code files of a source code repository from a user through an event. Each of the plurality of updated code files is updated by a set of user actions. The set of user actions includes at least one of an addition, a deletion, and a modification. The event is triggered in real-time when the plurality of updated code files is pushed to the source code repository. The method further includes extracting a plurality of user action parameters from the event corresponding to each of the plurality of updated code files. The plurality of user action parameters includes a file name, user name, a timestamp of each of the set of user actions, a description of each of the set of user actions, and user comments. The method further includes storing the plurality of updated code files and the plurality of user action parameters from the event corresponding to each of the plurality of updated code files in a database. The database includes a table with a column for each of the plurality of user action parameters. The method further includes identifying at least one of the set of user actions as a suspicious code contribution of the user for at least one of the plurality of updated code files of the source code based on the plurality of user action parameters.

In one embodiment, a system for identifying suspicious code contribution of a user to a source code repository is disclosed. In one example, the system includes a processor and a computer-readable medium communicatively coupled to the processor. The computer-readable medium store processor-executable instructions, which, on execution, cause the processor to receive a plurality of updated code files of a source code repository from a user through an event. Each of the plurality of updated code files is updated by a set of user actions. The set of user actions includes at least one of an addition, a deletion, and a modification. The event is triggered in real-time when the plurality of updated code files is pushed to the source code repository. The processor-executable instructions, on execution, further cause the processor to extract a plurality of user action parameters from the event corresponding to each of the plurality of updated code files. The plurality of user action parameters includes a file name, user name, a timestamp of each of the set of user actions, a description of each of the set of user actions, and user comments. The processor-executable instructions, on execution, further cause the processor to store the plurality of updated code files and the plurality of user action parameters from the event corresponding to each of the plurality of updated code files in a database. The database includes a table with a column for each of the plurality of user action parameters. The processor-executable instructions, on execution, further cause the processor to identify at least one of the set of user actions as a suspicious code contribution of the user for at least one of the plurality of updated code files of the source code based on the plurality of user action parameters.

In one embodiment, a non-transitory computer-readable medium storing computer-executable instructions for identifying suspicious code contribution of a user to a source code repository is disclosed. In one example, the stored instructions, when executed by a processor, cause the processor to perform operations including receiving, by a suspicious activity detection device, a plurality of updated code files of a source code repository from a user through an event. Each of the plurality of updated code files is updated by a set of user actions. The set of user actions includes at least one of an addition, a deletion, and a modification. The event is triggered in real-time when the plurality of updated code files is pushed to the source code repository. The operations further include extracting a plurality of user action parameters from the event corresponding to each of the plurality of updated code files. The plurality of user action parameters includes a file name, user name, a timestamp of each of the set of user actions, a description of each of the set of user actions, and user comments. The operations further include storing the plurality of updated code files and the plurality of user action parameters from the event corresponding to each of the plurality of updated code files in a database. The database includes a table with a column for each of the plurality of user action parameters. The operations further include identifying at least one of the set of user actions as a suspicious code contribution of the user for at least one of the plurality of updated code files of the source code based on the plurality of user action parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
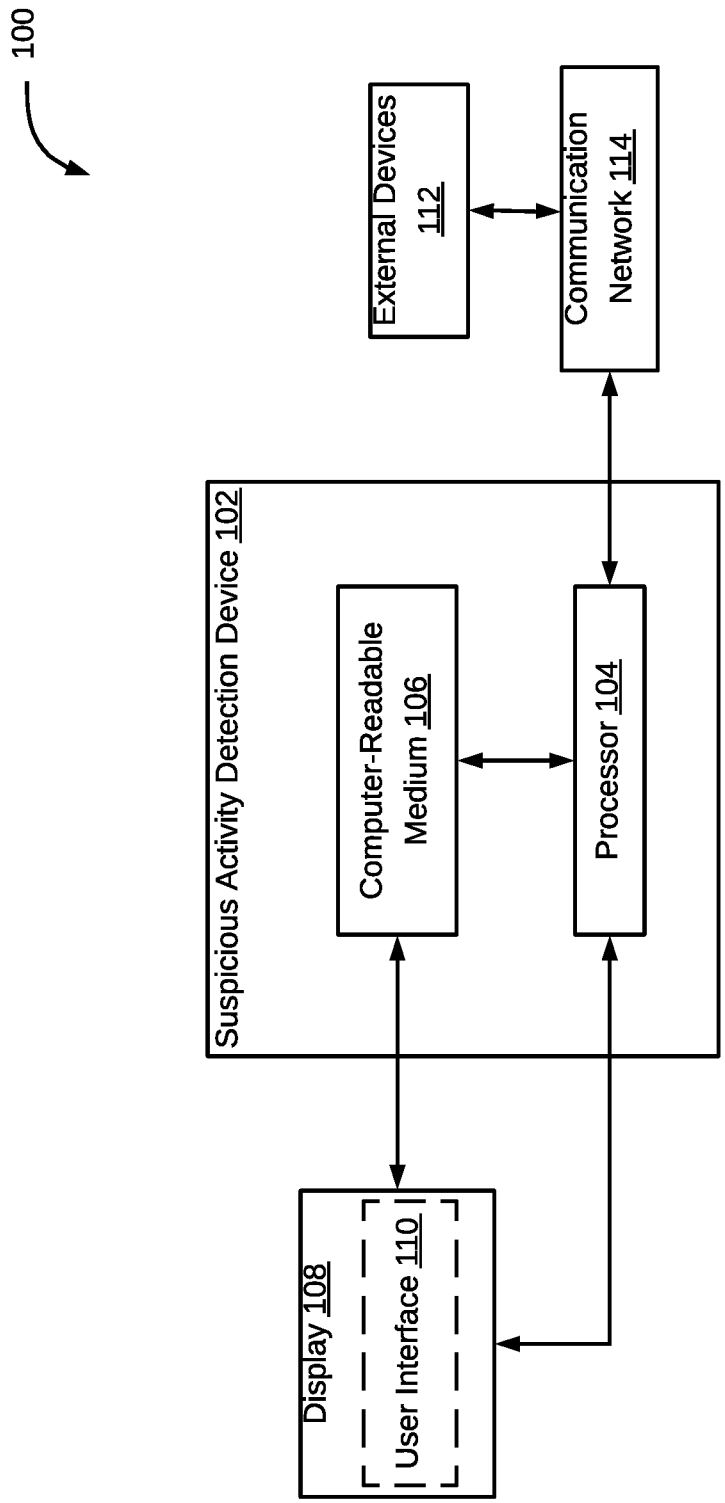
FIG. 1 is a block diagram of an exemplary system for identifying suspicious code contribution of a user to a source code repository, in accordance with some embodiments.

Referring now to FIG. 1, an exemplary system 100 for identifying suspicious code contribution of a user to a source code repository is illustrated, in accordance with some embodiments. The system 100 may implement a suspicious activity detection device 102 (for example, server, desktop, laptop, notebook, netbook, tablet, smartphone, mobile phone, or any other computing device), in accordance with some embodiments of the present disclosure. The suspicious activity detection device 102 may identify suspicious code contribution of a user to a source code repository through a plurality of user action parameters corresponding to each of a plurality of updated code files submitted by the user.

As will be described in greater detail in conjunction with FIGS. 2-9, the suspicious activity detection device 102 receives a plurality of updated code files of a source code repository from a user through an event. Each of the plurality of updated code files is updated by a set of user actions. The set of user actions includes at least one of an addition, a deletion, and a modification. The event is triggered in real-time when the plurality of updated code files is pushed to the source code repository. The suspicious activity detection device 102 further extracts a plurality of user action parameters from the event corresponding to each of the plurality of updated code files. The plurality of user action parameters includes a file name, user name, a timestamp of each of the set of user actions, a description of each of the set of user actions, and user comments. The suspicious activity detection device 102 further stores the plurality of updated code files and the plurality of user action parameters from the event corresponding to each of the plurality of updated code files in a database. The database includes a table with a column for each of the plurality of user action parameters. The suspicious activity detection device 102 further includes identifies at least one of the set of user actions as a suspicious code contribution of the user for at least one of the plurality of updated code files of the source code based on the plurality of user action parameters.

In some embodiments, the suspicious activity detection device 102 may include one or more processors 104 and a computer-readable medium 106 (for example, a memory). The computer-readable medium 106 may include the database. Further, the computer-readable storage medium 106 may store instructions that, when executed by the one or more processors 104, cause the one or more processors 104 to identify suspicious code contribution of a user to a source code repository, in accordance with aspects of the present disclosure. The computer-readable storage medium 106 may also store various data (for example, webhook data, the plurality of user action parameters, the plurality of updated code files, source code, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the suspicious activity detection device 102 may interact with the one or more external devices 112 over a communication network 114 for sending or receiving various data. The external devices 112 may include, but may not be limited to, a remote server, a digital device, or another computing system.

Figure 2:
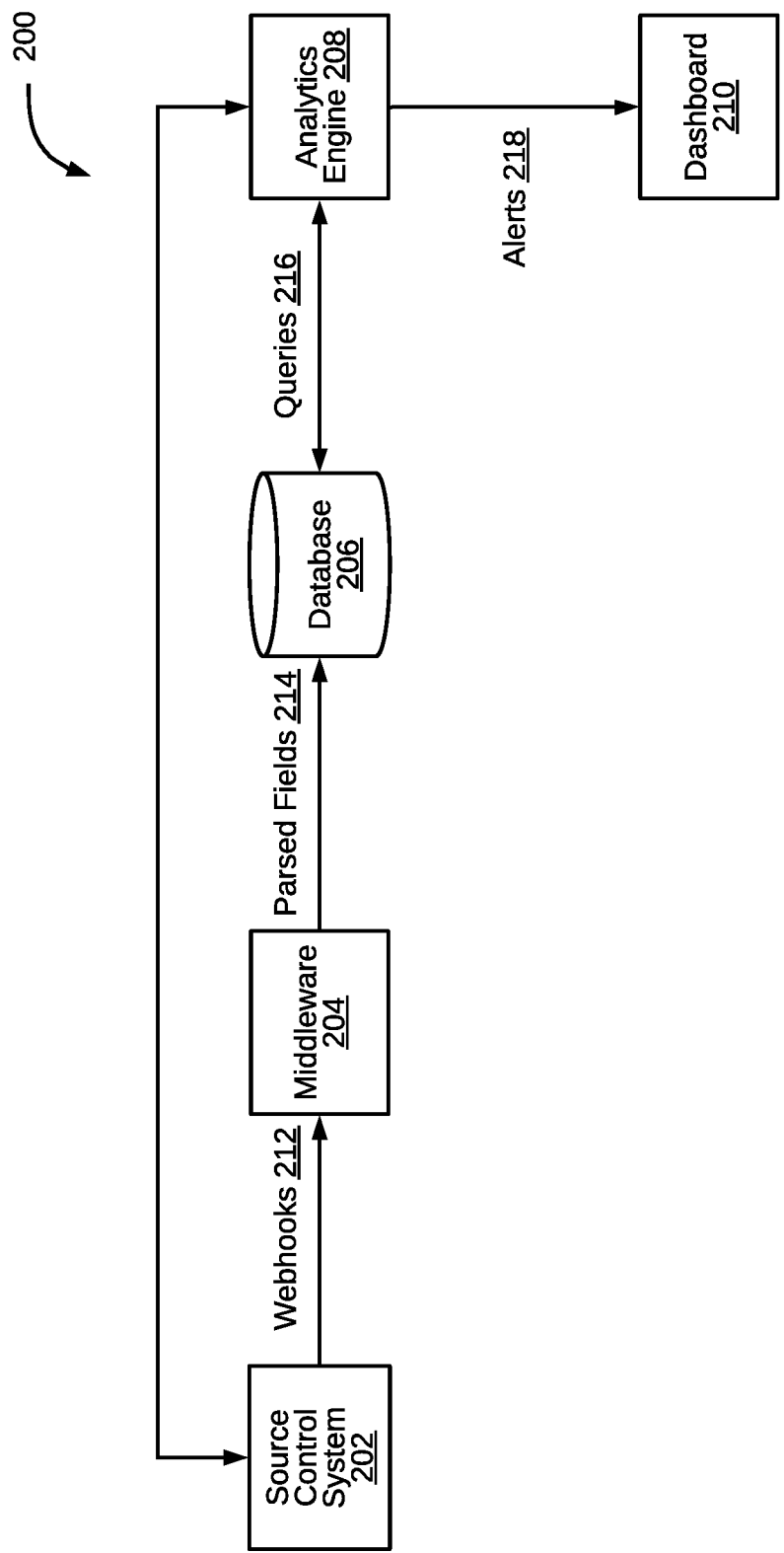
FIG. 2 illustrates a functional block diagram of an exemplary system for identifying suspicious code contribution of a user to a source code repository, in accordance with some embodiments.

Referring now to FIG. 2, functional block diagram of an exemplary system 200 for identifying suspicious code contribution of a user to a source code repository is illustrated, in accordance with some embodiments. In an embodiment, the system 200 is analogous to the suspicious code detection device 102 of the system 100. The system 200 includes a source control system 202, a middleware 204, a database 206, an analytics engine 208, and a dashboard 210. The source control system 202 includes the source code repository. Further, the source control system 202 receives a plurality of updated code files from the user. Each of the plurality of updated code files is updated by a set of user actions. The set of user actions includes at least one of an addition, a deletion, and a modification.

Further, upon receiving a plurality of updated code files by the source control system 202, an event (such as, a webhook 212 (for example, HCL VersionVault's 'deliver' webhook, Microsoft's GitHub 'pull request' webhook, or the like) is triggered. It may be noted that the webhook 212 is an event initiated by the source control system 202 which provides other applications with real-time information. Further, the webhook 212 is sent to the middleware 204. By way of an example, the middleware 204 is a Representational State Transfer (REST) Application Programming Interface (API). The middleware 204 extracts a plurality of user action parameters from the webhook 212 in form of parsed fields 214 corresponding to each of the plurality of updated code files. By way of an example, the plurality of user action parameters includes a file name, user name, a timestamp of each of the set of user actions, a description of each of the set of user actions, and user comments.

Further, the middleware 204 sends the parsed fields 214 to the database 206. The database 206 stores the plurality of updated code files and the parsed fields 214 corresponding to each of the plurality of updated code files. In an embodiment, the database includes a table with a column for each of the parsed fields 214. Further, the analytics engine 208 communicates with the database 206 periodically via queries 216 to monitor suspicious code contribution. It may be noted that the queries 216 may be scheduled or may be sent on demand.

The database 206 includes each of the plurality of updated code files and previous versions of each of the plurality of updated code files, a timestamp of the set of user actions performed on each of a plurality of sections of each of the plurality of updated code files, and a timestamp of the set of user actions performed on each of a plurality of sections of each of the previous versions of the plurality of updated code files.

Further, the analytics engine 208 identifies at least one of the set of user actions for at least one of the plurality of updated code files as a suspicious code contribution based on the parsed fields 214 when the at least one of the set of user actions. The analytics engine 208 may have a set of criteria to establish an updated code file or a section in the updated code file as a suspicious code contribution.

In some embodiments, for each of the plurality of updated code files, the analytics engine 208 compares the timestamp of each of the set of user actions with a timestamp of most recent of previous actions performed on an updated code file. Further, the analytics engine 208 establishes a user action as a suspicious code contribution when a difference between the timestamp of the user action and the timestamp of the most recent of the previous actions is greater than a predefined threshold.

In some embodiments, for each of the plurality of updated code files and for each of the plurality of sections in an updated code file, the analytics engine 208 compares a section in the updated code file with a corresponding section in most recent of the previous versions of the updated code file. A user action is performed on the section in the updated code file, and wherein the user action is a modification. Further, the analytics engine 208 compares a timestamp of the user action with a timestamp of most recent of previous actions performed on the corresponding section in the most recent of the previous versions of the updated code file. Further, the analytics engine 208 establishes the user action as a suspicious code contribution when a difference between the timestamp of the user action and the timestamp of the most recent of the previous actions is greater than a predefined threshold.

In some embodiments, for each of the plurality of updated code files, the analytics engine 208 determines a number of the set of user actions performed by the user on an updated code file and each of previous versions of the updated code file. Further, the analytics engine 208 establishes a user action as a suspicious code contribution when the number of the set of user actions performed by the user is less than a predefined threshold.

Further, upon establishing a user action as a suspicious code contribution, the analytics engine 208 initiates an alert upon identifying the suspicious code contribution of the user. Further, the dashboard 210 displays the alert. The dashboard 210 includes a plurality of suspicious code contribution trends corresponding to each of a plurality of users. The user is one of the plurality of users. Further, an administrator may validate each of the set of user actions of the user for each of the plurality of updated code files using the dashboard 210. Upon successful validation by the administrator, the set of user actions in each of the plurality of updated code files may be accepted into the source code repository.

It should be noted that all such aforementioned modules 202-210 may be represented as a single module or a combination of different modules. Further, as will be appreciated by those skilled in the art, each of the modules 202-210 may reside, in whole or in parts, on one device or multiple devices in communication with each other. In some embodiments, each of the modules 202-210 may be implemented as dedicated hardware circuit comprising custom application-specific integrated circuit (ASIC) or gate arrays, off-the-shelf semiconductors such as logic chips, transistors, or other discrete components. Each of the modules 202-210 may also be implemented in a programmable hardware device such as a field programmable gate array (FPGA), programmable array logic, programmable logic device, and so forth. Alternatively, each of the modules 202-210 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying suspicious code contribution of a user to a source code repository. For example, the exemplary system 100 and the associated suspicious activity detection device 102 may identify suspicious code contribution of a user to a source code repository by the processes discussed herein. In particular, as will be appreciated by those of ordinary skill in the art, control logic and/or automated routines for performing the techniques and steps described herein may be implemented by the system 100 and the suspicious activity detection device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
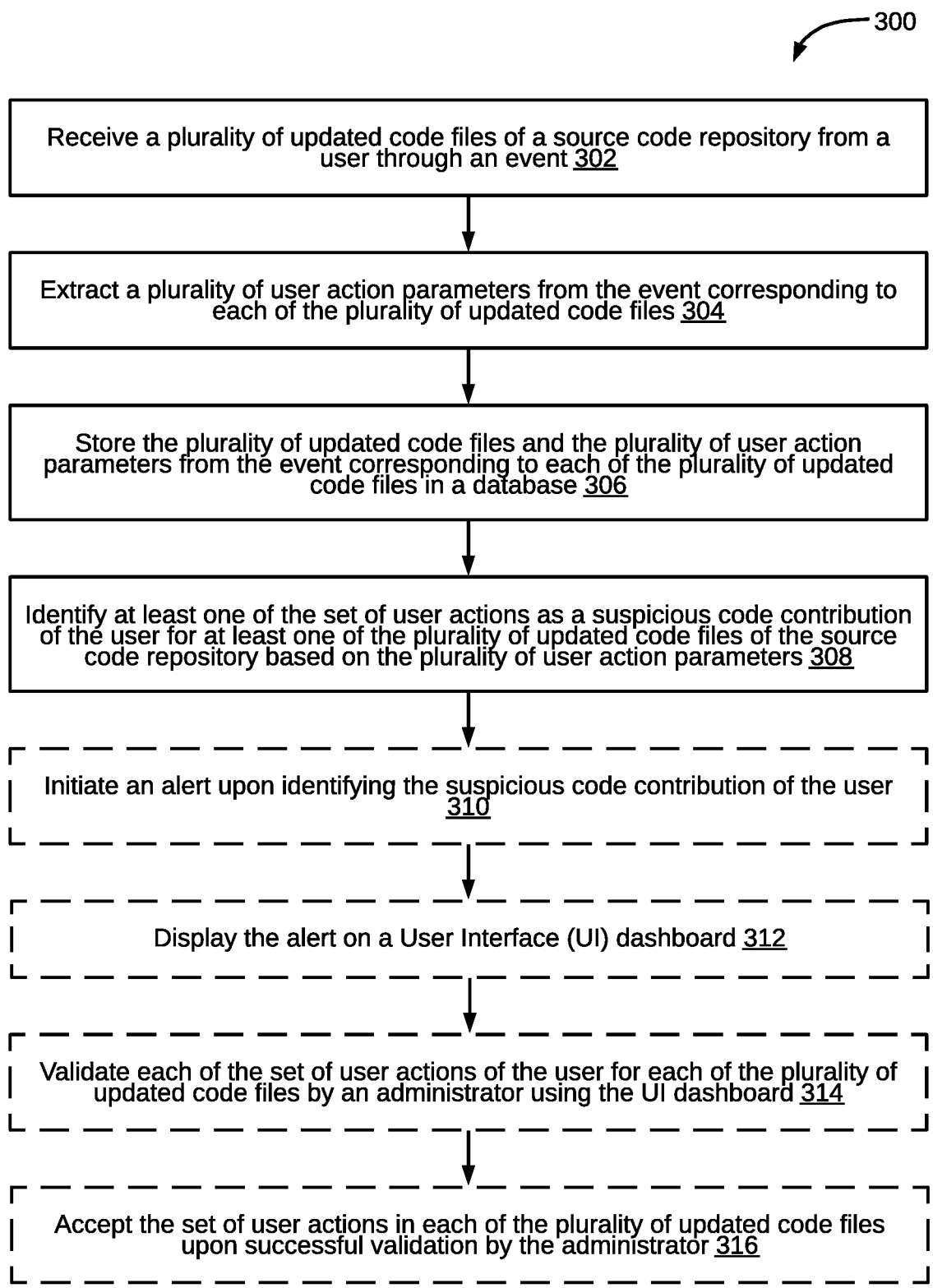
FIG. 3 illustrates a flow diagram of an exemplary process for identifying suspicious code contribution of a user to a source code repository, in accordance with some embodiments.

Referring now to FIG. 3, an exemplary process 300 for identifying suspicious code contribution of a user to a source code repository is depicted via a flowchart, in accordance with some embodiments. In an embodiment, the process 300 may be implemented by the suspicious code detection device 102 of the system 100. The process 300 includes receiving a plurality of updated code files of a source code repository from a user through an event (for example, the webhook 212), at step 302. Each of the plurality of updated code files is updated by a set of user actions. The set of user actions includes at least one of an addition, a deletion, and a modification. The event is triggered in real-time when the plurality of updated code files is pushed to the source code.

Further, the process 300 includes extracting a plurality of user action parameters from the event corresponding to each of the plurality of updated code files, at step 304. The plurality of user action parameters includes a file name, user name, a timestamp of each of the set of user actions, a description of each of the set of user actions, and user comments. Further, the process 300 includes storing the plurality of updated code files and the plurality of user action parameters from the event corresponding to each of the plurality of updated code files in a database, at step 306.

Further, the process 300 includes identifying at least one of the set of user actions as a suspicious code contribution of the user for at least one of the plurality of updated code files of the source code based on the plurality of user action parameters, at step 308. The database includes a table with a column for each of the plurality of user action parameters. By way of an example, the source control system 202 receives a plurality of updated code files for a source code repository. Further, the source control system 202 triggers webhooks 212 to send real-time information to the middleware 204. Further, the middleware parses the real-time information to send parsed fields 214 to the database 206. The parsed fields 214 may include the plurality of user action parameters. Further, the analytics engine 208 determines whether a user action performed on an updated code file is a suspicious code contribution based on the parsed fields 214 and the plurality of updated code files received by the source control system 202 through various predefined criteria (such as, code submission by a new user, code submission for a dormant file, code submission for a dormant section in a file, etc.).

Further, the process 300 includes initiating an alert upon identifying the suspicious code contribution of the user, at step 310. Further, the process 300 includes displaying the alert on a UI dashboard, at step 312. The UI dashboard includes a plurality of suspicious code contribution trends corresponding to each of a plurality of users. The user is one of the plurality of users. Further, the process 300 includes validating each of the set of user actions of the user for each of the plurality of updated code files by an administrator using the UI dashboard, at step 314.

Further, the process 300 includes accepting the set of user actions in each of the plurality of updated code files upon successful validation by the administrator, at step 316. In continuation of the example above, when a user action is established as a suspicious code contribution, the analytics engine 208 initiates and renders alerts 218 to the dashboard 210. The dashboard 210 is accessible by the administrator via a UI. The administrator may validate or reject a code submission by the user based on a review performed for an updated code file for which the alert is generated.

Figure 4:
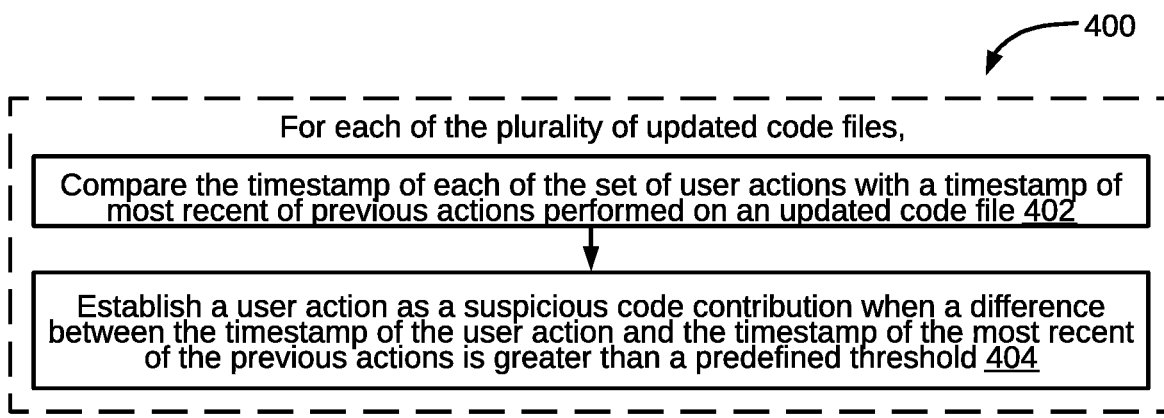
FIG. 4 illustrates a flow diagram of an exemplary process for establishing a user action as a suspicious code contribution, in accordance with some embodiments.

Referring now to FIG. 4, an exemplary process 400 for establishing a user action as a suspicious code contribution is depicted via a flow chart, in accordance with some embodiments. In an embodiment, the process 400 may be implemented by the suspicious code detection device 102 of the system 100. For each of the plurality of updated code files, the process 400 includes comparing the timestamp of each of the set of user actions with a timestamp of most recent of previous actions performed on an updated code file, at step 402. Further, for each of the plurality of updated code files, the process 400 includes establishing a user action as a suspicious code contribution when a difference between the timestamp of the user action and the timestamp of the most recent of the previous actions is greater than a predefined threshold, at step 404.

Figure 5:
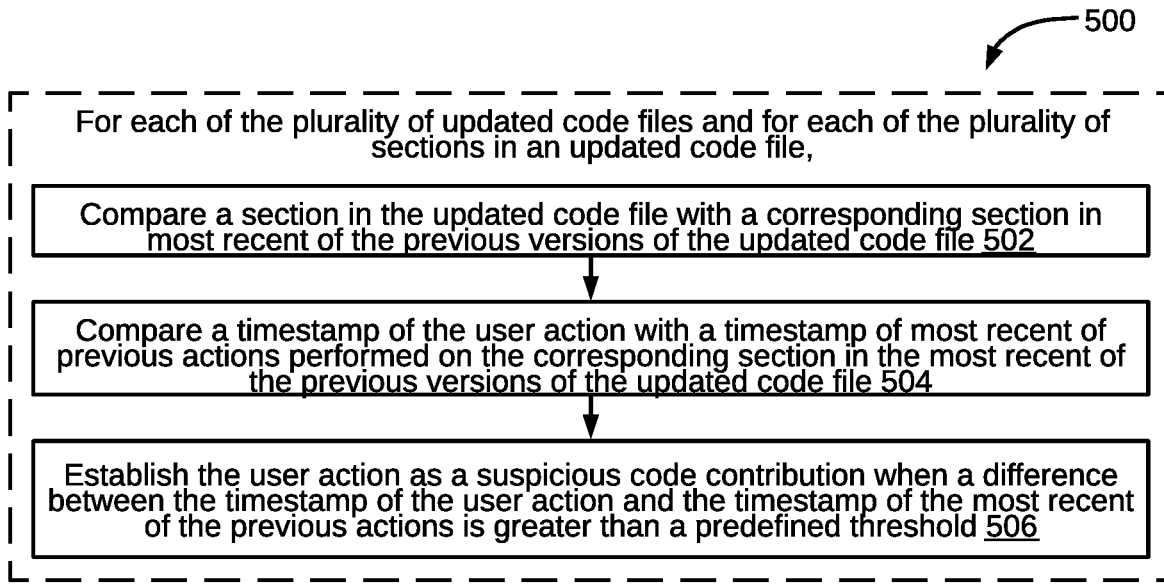
FIG. 5 illustrates a flow diagram of an exemplary process for establishing a user action as a suspicious code contribution, in accordance with some embodiments.

Referring now to FIG. 5, an exemplary process 500 for establishing a user action as a suspicious code contribution is depicted via a flow chart, in accordance with some embodiments. In an embodiment, the process 500 may be implemented by the suspicious code detection device 102 of the system 100. The database 206 may include each of the plurality of updated code files and previous versions of each of the plurality of updated code files, a timestamp of the set of user actions performed on each of a plurality of sections of each of the plurality of updated code files, and a timestamp of the set of user actions performed on each of a plurality of sections of each of the previous versions of the plurality of updated code files. For each of the plurality of updated code files and for each of the plurality of sections in an updated code file, the process 500 includes comparing a section in the updated code file with a corresponding section in most recent of the previous versions of the updated code file, at step 502. A user action is performed on the section in the updated code file. The user action is a modification.

Further, for each of the plurality of updated code files and for each of the plurality of sections in an updated code file, the process 500 includes comparing a timestamp of the user action with a timestamp of most recent of previous actions performed on the corresponding section in the most recent of the previous versions of the updated code file, at step 504. Further, for each of the plurality of updated code files and for each of the plurality of sections in an updated code file, the process 500 includes establishing the user action as a suspicious code contribution when a difference between the timestamp of the user action and the timestamp of the most recent of the previous actions is greater than a predefined threshold, at step 506.

Figure 6:
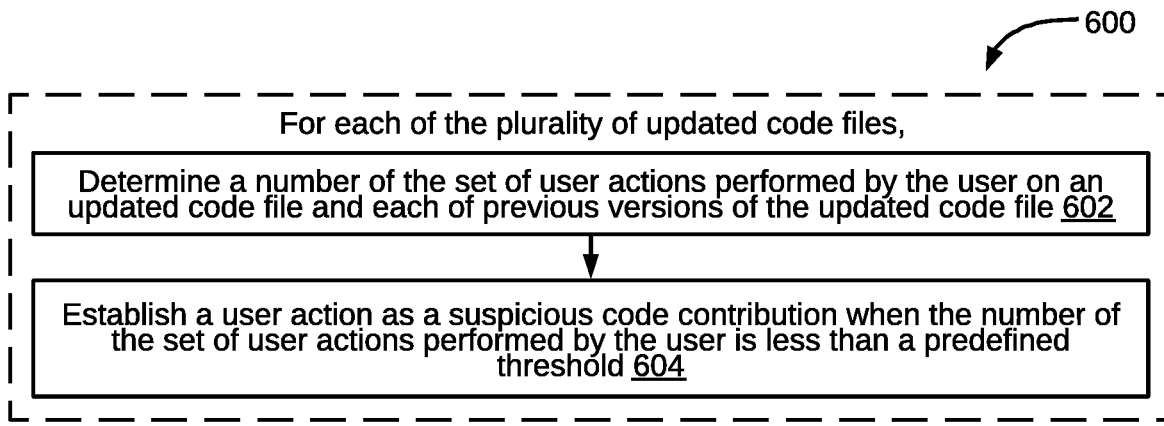
FIG. 6 illustrates a flow diagram of an exemplary process for establishing a user action as a suspicious code contribution, in accordance with some embodiments.

Referring now to FIG. 6, an exemplary process 600 for establishing a user action as a suspicious code contribution is depicted via a flow chart, in accordance with some embodiments. In an embodiment, the process 600 may be implemented by the suspicious code detection device 102 of the system 100. For each of the plurality of updated code files, the process 600 includes determining a number of the set of user actions performed by the user on an updated code file and each of previous versions of the updated code file, at step 602. Further, for each of the plurality of updated code files, the process 600 includes establishing a user action as a suspicious code contribution when the number of the set of user actions performed by the user is less than a predefined threshold, at step 604.

Figure 7:
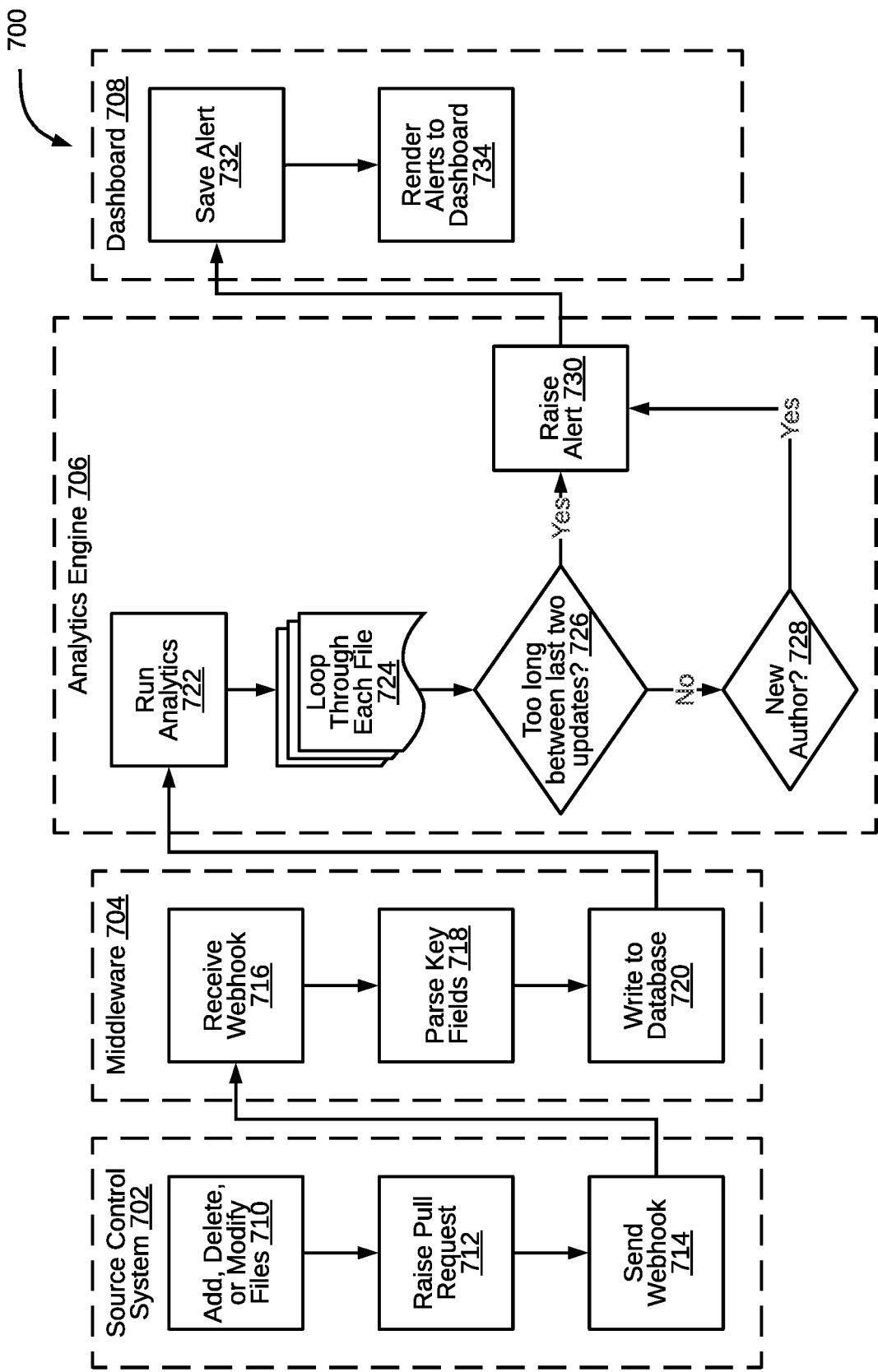
FIG. 7 illustrates a detailed exemplary control logic for identifying suspicious code contribution of a user to a source code repository, in accordance with some embodiments.

Referring now to FIG. 7, a detailed exemplary control logic 700 for identifying suspicious code contribution of a user to a source code repository is illustrated, in accordance with an embodiment. In an embodiment, the control logic 700 is implemented by the suspicious code detection device 102 of the system 100. An exemplary suspicious code detection device (analogous to the suspicious code detection device 102) may include a source control system 702, a middleware 704 (for example, an API), an analytics engine 706, and a dashboard 708. The control logic 700 includes adding, deleting, or modifying files, at step 710. The source code may include a plurality of files. A user may perform a set of user actions to update one or more of the plurality of files in the source code. By way of an example, the set of user actions may include addition, deletion, or modification. Further, the control logic 700 includes raising pull request, at step 712. The user may raise the pull request for incorporating each of the plurality of updated files into the source code.

Further, the control logic 700 includes sending webhook, at step 714. Upon receiving the pull request from the user, the source control system 702 triggers a webhook and sends the webhook to the middleware 704. The webhook includes real-time information from each of the plurality of updated files. Further, the control logic 700 includes receiving the webhook by the middleware, at step 716. Further, the control logic 700 includes parsing key fields, at step 718. The middleware 704 may extract a plurality of user action parameters from the webhook corresponding to each of the plurality of updated code files. The plurality of user action parameters includes a file name, user name, a timestamp of each of the set of user actions, a description of each of the set of user actions, and user comments. Further, the control logic 700 includes writing to database (such as, the database 206), at step 720. The middleware 704 stores the plurality of updated code files and the plurality of user action parameters from the event corresponding to each of the plurality of updated code files in the database 206. The database 206 includes a table with a column for each of the plurality of user action parameters.

Further, the control logic 700 includes running analytics, at step 722. The analytics engine 706 performs various analyses based on information (the plurality of updated code files and the plurality of user action parameters) stored in the database. Further, the control logic 700 includes looping through each file, at step 724. The analytics engine loops through each of the plurality of updated code files and each of the plurality of sections in an updated code file. Further, at step 726 of the control logic 700, a check is performed to determine whether time between last two updates is above a predefined threshold. The analytics engine 706 compares the timestamp of each of the set of user actions performed on an updated code file with a timestamp of most recent of previous actions performed on an updated code file.

When the time between last two updates is not above a predefined threshold, at step 728 of the control logic 700, a check is performed to determine whether the user is a new author. The analytics engine 706 determines a number of the set of user actions performed by the user on an updated code file and each of previous versions of the updated code file. When the time between last two updates is above a predefined threshold or when the user is a new author, the control logic 700 includes raising an alert, at step 730. The analytics engine 706 may establish a user action as a suspicious code contribution when a difference between the timestamp of the user action and the timestamp of the most recent of the previous actions is greater than a predefined threshold. Additionally, the analytics engine 706 may establish a user action as a suspicious code contribution when the number of the set of user actions performed by the user is less than a predefined threshold. Upon establishing a user action as a suspicious code contribution, the analytics engine 706 may raise an alert for an administrator (such as, a team lead or a moderator of the source code repository).

In some embodiments, the analytics engine 706 may loop through each of the plurality of sections in an updated code file. The plurality of sections may be predefined by the user (for example, functions and classes in a code file). In such embodiments, the analytics engine 706 may compare a section in the updated code file with a corresponding section in most recent of the previous versions of the updated code file. It may be noted that in such embodiments, a user action is performed on the section in the updated code file and the user action is a modification. Further, the analytics engine 706 may compare a timestamp of the user action with a timestamp of most recent of previous actions performed on the corresponding section in the most recent of the previous versions of the updated code file. Further, the analytics engine 706 may establish the user action as a suspicious code contribution when a difference between the timestamp of the user action and the timestamp of the most recent of the previous actions is greater than a predefined threshold. Upon establishing a user action as a suspicious code contribution, the analytics engine 706 may raise an alert for an administrator (such as, a team lead or a moderator of the source code repository).

Further, the control logic 700 includes saving the alert, at step 732. The alert raised by the analytics engine 706 is saved into the dashboard 708. Further, the control logic 700 includes rendering alerts to dashboard, at step 734. Further, the dashboard 708 renders the alert. The dashboard 708 may include a plurality of suspicious code contribution trends corresponding to each of a plurality of users.

By way of an example, Gus is working on a project to fix historic date formats in accounting software in preparation for Y2038 bug. He has been chosen to work on the project since he has worked in this area of the code for few years and he knows how the code is structured and what it does. Gus raises a pull request. Gus's supervisor approves the pull request. Further, the code is merged and scanned, and the analytics is executed.

A webhook is fired when Gus's pull request is submitted. The system loops through each file in the pull request. Additionally, the system records within a database name of the file, time of modification of the file, actions performed on the file, name of author (Gus), comments by the author (changes made to the file as per Gus). Further, the system detects that Gus has worked on the files before and that Gus has worked on the files recently. Gus's supervisor checks the dashboard. The build runs.

The next day, Gus completes assigned tasks in allotted time but also updates the accounting system's code to route rounding errors produced by mathematical operations in Gus's code to a personal checking account. Gus raises a pull request. Gus's supervisor approves the pull request, the code is merged and scanned, and the analytics is executed.

Another webhook is fired when Gus's pull request is submitted. The system loops through each file in the pull request and records in a database name of the file, time of modification, actions taken on the file, name of author (Gus), comments by the author (changes made to the file as per Gus). Further, the system detects that Gus has worked on some of the files before and that Gus worked on them recently. The system also detects that Gus has touched a piece of code that was not touched in a long time by Gus. An alert is raised. Gus's supervisor checks the dashboard and knows to take a another look at the code recently submitted by Gus. The build is halted and Gus gets a call from a security architect.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
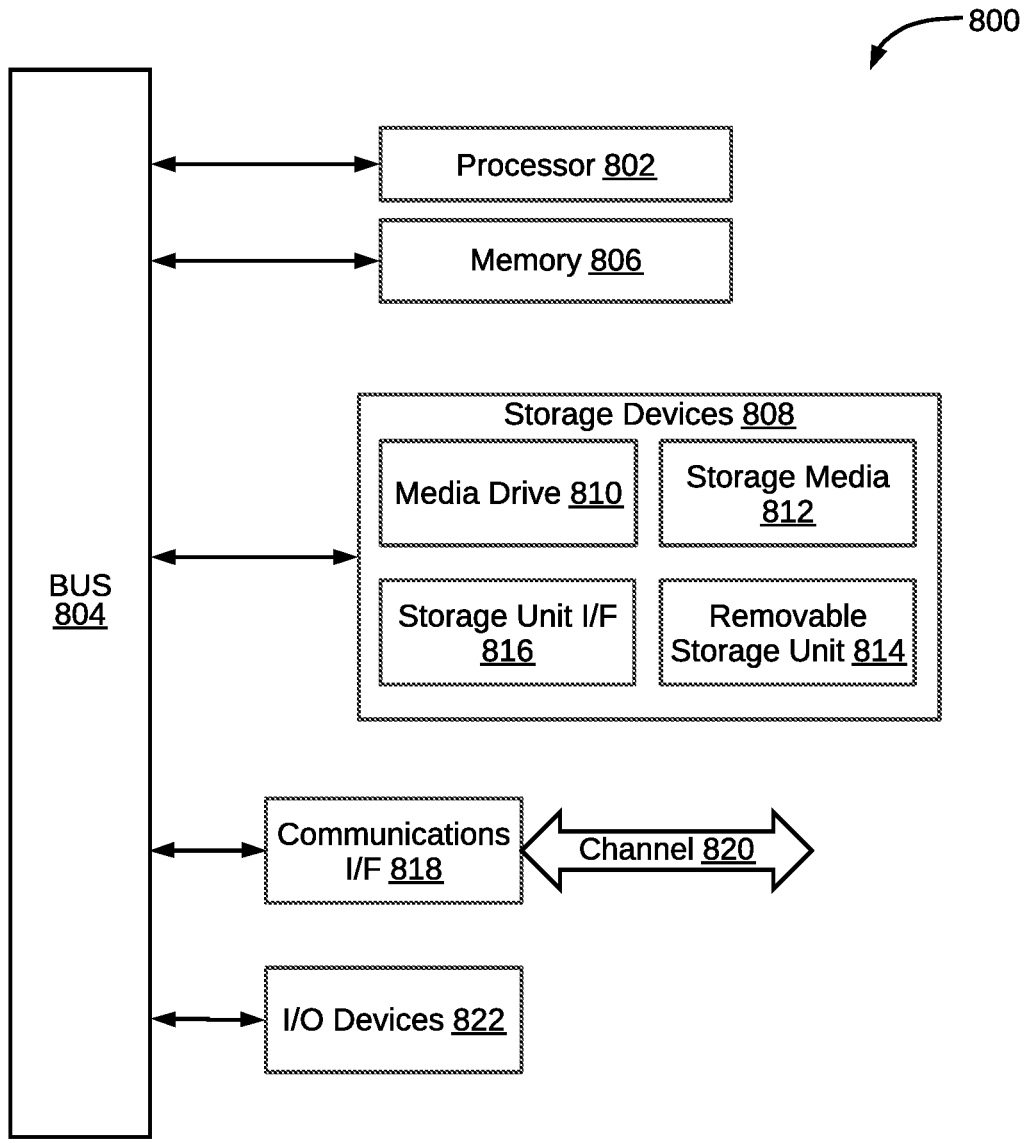
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, an exemplary computing system 800 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 800 may represent, for example, a user device such as a desktop, a laptop, a mobile phone, personal entertainment device, DVR, and so on, or any other type of special or general-purpose computing device as may be desirable or appropriate for a given application or environment. The computing system 800 may include one or more processors, such as a processor 802 that may be implemented using a general or special purpose processing engine such as, for example, a microprocessor, microcontroller or other control logic. In this example, the processor 802 is connected to a bus 804 or other communication medium. In some embodiments, the processor 802 may be an Artificial Intelligence (AI) processor, which may be implemented as a Tensor Processing Unit (TPU), or a graphical processor unit, or a custom programmable solution Field-Programmable Gate Array (FPGA).

The computing system 800 may also include a memory 806 (main memory), for example, Random Access Memory (RAM) or other dynamic memory, for storing information and instructions to be executed by the processor 802. The memory 806 also may be used for storing temporary variables or other intermediate information during execution of instructions to be executed by the processor 802. The computing system 800 may likewise include a read only memory ("ROM") or other static storage device coupled to bus 804 for storing static information and instructions for the processor 802.

The computing system 800 may also include a storage devices 808, which may include, for example, a media drive 810 and a removable storage interface. The media drive 810 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 812 may include, for example, a hard disk, magnetic tape, flash drive, or other fixed or removable medium that is read by and written to by the media drive 810. As these examples illustrate, the storage media 812 may include a computer-readable storage medium having stored therein particular computer software or data.

In alternative embodiments, the storage devices 808 may include other similar instrumentalities for allowing computer programs or other instructions or data to be loaded into the computing system 800. Such instrumentalities may include, for example, a removable storage unit 814 and a storage unit interface 816, such as a program cartridge and cartridge interface, a removable memory (for example, a flash memory or other removable memory module) and memory slot, and other removable storage units and interfaces that allow software and data to be transferred from the removable storage unit 814 to the computing system 800.

The computing system 800 may also include a communications interface 818. The communications interface 818 may be used to allow software and data to be transferred between the computing system 800 and external devices. Examples of the communications interface 818 may include a network interface (such as an Ethernet or other NIC card), a communications port (such as for example, a USB port, a micro USB port), Near field Communication (NFC), etc. Software and data transferred via the communications interface 818 are in the form of signals which may be electronic, electromagnetic, optical, or other signals capable of being received by the communications interface 818. These signals are provided to the communications interface 818 via a channel 820. The channel 820 may carry signals and may be implemented using a wireless medium, wire or cable, fiber optics, or other communications medium. Some examples of the channel 820 may include a phone line, a cellular phone link, an RF link, a Bluetooth link, a network interface, a local or wide area network, and other communications channels.

The computing system 800 may further include Input/Output (I/O) devices 822. Examples may include, but are not limited to a display, keypad, microphone, audio speakers, vibrating motor, LED lights, etc. The I/O devices 822 may receive input from a user and also display an output of the computation performed by the processor 802. In this document, the terms "computer program product" and "computer-readable medium" may be used generally to refer to media such as, for example, the memory 806, the storage devices 808, the removable storage unit 814, or signal(s) on the channel 820. These and other forms of computer-readable media may be involved in providing one or more sequences of one or more instructions to the processor 802 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into the computing system 800 using, for example, the removable storage unit 814, the media drive 810 or the communications interface 818. The control logic (in this example, software instructions or computer program code), when executed by the processor 802, causes the processor 802 to perform the functions of the invention as described herein.

Thus, the disclosed method and system try to overcome the technical problem of identifying suspicious code contribution of a user to a source code repository. The method and system provide means to successfully capture potentially suspicious and malicious code contributions. Further, the method and system provide general trends and specific anomalies through the dashboard. Further, the method and system may successfully work using GitHub Enterprise, Node-Red, MongoDB, Python, Kibana and Elasticsearch. Further, the method and system compliment HCL™ VersionVault and HCL™ Accelerate. Further, the method and system may potentially leverage HCL™ OneDB and HCL™ Link. Further, the method and system fill a blind spot within HCL™ Appscan.

As will be appreciated by those skilled in the art, the techniques described in the various embodiments discussed above are not routine, or conventional, or well understood in the art. The techniques discussed above provide for identifying suspicious code contribution of a user to a source code repository. The techniques first receive a plurality of updated code files of a source code repository from a user through an event. Each of the plurality of updated code files is updated by a set of user actions. The set of user actions includes at least one of an addition, a deletion, and a modification. The techniques then extract a plurality of user action parameters from the event corresponding to each of the plurality of updated code files. The plurality of user action parameters includes a file name, user name, a timestamp of each of the set of user actions, a description of each of the set of user actions, and user comments. The techniques then store the plurality of updated code files and the plurality of user action parameters from the event corresponding to each of the plurality of updated code files in a database. The database includes a table with a column for each of the plurality of user action parameters. The techniques then identify at least one of the set of user actions as a suspicious code contribution of the user for at least one of the plurality of updated code files of the source code based on the plurality of user action parameters.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for identifying suspicious code contribution of a user to a source code repository. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying suspicious code contribution of a user to a source code repository, the method comprising:
   receiving, by a suspicious activity detection device, a plurality of updated code files of the source code repository through an event, wherein each of the plurality of updated code files is updated by a set of user actions, wherein the set of user actions comprises at least one of an addition, a deletion, and a modification made by the user, and wherein the event is triggered in real-time when at least one of the plurality of updated code files is pushed to the source code repository;
   extracting, by the suspicious activity detection device, a plurality of user action parameters from the event corresponding to each of the plurality of updated code files, wherein the plurality of user action parameters comprises a file name, a user name, a timestamp of each of the set of user actions, a description of each of the set of user actions, and user comments;
   storing, by the suspicious activity detection device, the plurality of updated code files and the plurality of user action parameters from the event corresponding to each of the plurality of updated code files in a database, wherein the database comprises a table with a column for each of the plurality of user action parameters; and
   identifying, by the suspicious activity detection device, at least one user action from the set of user actions as a suspicious code contribution of the user for at least one of the plurality of updated code files of the source code repository based on the plurality of user action parameters, wherein identifying the at least one user action from the set of user actions as a suspicious code contribution comprises:
   for each of the plurality of updated code files,
      comparing the timestamp of each of the set of user actions with a timestamp of most recent of previous actions performed on an updated code file;
      establishing a user action as a suspicious code contribution when a difference between the timestamp of the user action and the timestamp of the most recent of the previous actions is below a predefined threshold and the user action is performed by a new author; and
      establishing a user action as a suspicious code contribution when a difference between the timestamp of the user action and the timestamp of the most recent of the previous actions is greater than a predefined threshold.

2. The method of claim 1, wherein the database further comprises:
   each of the plurality of updated code files and previous versions of each of the plurality of updated code files;
   a timestamp of the set of user actions performed on each of a plurality of sections of each of the plurality of updated code files; and
   a timestamp of the set of user actions performed on each of a plurality of sections of each of the previous versions of the plurality of updated code files.

3. The method of claim 2, wherein identifying at least of one the set of user actions as a suspicious code contribution of the user for at least one of the plurality of updated code files comprises:

for each of the plurality of updated code files and for each of the plurality of sections in an updated code file,
comparing a section in the updated code file with a corresponding section in most recent of the previous versions of the updated code file, wherein a user action is performed on the section in the updated code file, and wherein the user action is a modification;
comparing a timestamp of the user action with a timestamp of most recent of previous actions performed on the corresponding section in the most recent of the previous versions of the updated code file; and
establishing the user action as a suspicious code contribution when a difference between the timestamp of the user action and the timestamp of the most recent of the previous actions is greater than a predefined threshold.

4. The method of claim 1, wherein identifying at least one of the set of user actions as a suspicious code contribution of the user for at least one of the plurality of updated code files comprises:
for each of the plurality of updated code files,
determining a number of the set of user actions performed by the user on an updated code file and each of previous versions of the updated code file; and
establishing a user action as a suspicious code contribution when the number of the set of user actions performed by the user is less than a predefined threshold.

5. The method of claim 1, further comprising:
initiating an alert upon identifying the suspicious code contribution of the user; and
displaying the alert on a User Interface (UI) dashboard, wherein the UI dashboard comprises a plurality of suspicious code contribution trends corresponding to each of a plurality of users, and wherein the user is one of the plurality of users.

6. The method of claim 5, further comprising:
validating each of the set of user actions of the user for each of the plurality of updated code files by an administrator using the UI dashboard; and
accepting the set of user actions in each of the plurality of updated code files upon successful validation by the administrator.

7. A system for identifying suspicious code contribution of a user to a source code repository, the system comprising:
a processor; and
a memory communicatively coupled to the processor, wherein the memory stores processor instructions, which when executed by the processor, cause the processor to:
receive a plurality of updated code files of the source code repository through an event, wherein each of the plurality of updated code files is updated by a set of user actions, wherein the set of user actions comprises at least one of an addition, a deletion, and a modification made by the user, and wherein the event is triggered in real-time when at least one of the plurality of updated code files is pushed to the source code repository;
extract a plurality of user action parameters from the event corresponding to each of the plurality of updated code files, wherein the plurality of user action parameters comprises a file name, a user name, a timestamp of each of the set of user actions, a description of each of the set of user actions, and user comments;
store the plurality of updated code files and the plurality of user action parameters from the event corresponding to each of the plurality of updated code files in a database, wherein the database comprises a table with a column for each of the plurality of user action parameters; and
identify at least one user action from the set of user actions as a suspicious code contribution of the user for at least one of the plurality of updated code files of the source code repository based on the plurality of user action parameters, wherein identifying the at least one user action from the set of user actions as a suspicious code contribution comprises:
for each of the plurality of updated code files,
comparing the timestamp of each of the set of user actions with a timestamp of most recent of previous actions performed on an updated code file;
establishing a user action as a suspicious code contribution when a difference between the timestamp of the user action and the timestamp of the most recent of the previous actions is below a predefined threshold and the user action is performed by a new author; and
establishing a user action as a suspicious code contribution when a difference between the timestamp of the user action and the timestamp of the most recent of the previous actions is greater than a predefined threshold.

8. The system of claim 7, wherein the database further comprises:
each of the plurality of updated code files and previous versions of each of the plurality of updated code files;
a timestamp of the set of user actions performed on each of a plurality of sections of each of the plurality of updated code files; and
a timestamp of the set of user actions performed on each of a plurality of sections of each of the previous versions of the plurality of updated code files.

9. The system of claim 8, wherein to identify at least of one the set of user actions as a suspicious code contribution of the user for at least one of the plurality of updated code files, the processor instructions, on execution, cause the processor to:
for each of the plurality of updated code files and for each of the plurality of sections in an updated code file,
comparing a section in the updated code file with a corresponding section in most recent of the previous versions of the updated code file, wherein a user action is performed on the section in the updated code file, and wherein the user action is a modification;
comparing a timestamp of the user action with a timestamp of most recent of previous actions performed on the corresponding section in the most recent of the previous versions of the updated code file; and
establishing the user action as a suspicious code contribution when a difference between the timestamp of the user action and the timestamp of the most recent of the previous actions is greater than a predefined threshold.

10. The system of claim 7, wherein to identify at least one of the set of user actions as a suspicious code contribution of the user for at least one of the plurality of updated code files, the processor instructions, on execution, cause the processor to:
for each of the plurality of updated code files,
determining a number of the set of user actions performed by the user on an updated code file and each of previous versions of the updated code file; and
establishing a user action as a suspicious code contribution when the number of the set of user actions performed by the user is less than a predefined threshold.

11. The system of claim 7, wherein the processor instructions, on execution, further cause the processor to:
initiating an alert upon identifying the suspicious code contribution of the user; and
displaying the alert on a User Interface (UI) dashboard, wherein the UI dashboard comprises a plurality of suspicious code contribution trends corresponding to each of a plurality of users, and wherein the user is one of the plurality of users.

12. The system of claim 11, wherein the processor instructions, on execution, further cause the processor to:
validating each of the set of user actions of the user for each of the plurality of updated code files by an administrator using the UI dashboard; and
accepting the set of user actions in each of the plurality of updated code files upon successful validation by the administrator.

13. A non-transitory computer-readable medium storing computer-executable instructions for identifying suspicious code contribution of a user to a source code repository, the computer-executable instructions configured for:
receiving a plurality of updated code files of the source code repository through an event, wherein each of the plurality of updated code files is updated by a set of user actions, wherein the set of user actions comprises at least one of an addition, a deletion, and a modification made by the user, and wherein the event is triggered in real-time when at least one of the plurality of updated code files is pushed to the source code repository;
extracting a plurality of user action parameters from the event corresponding to each of the plurality of updated code files, wherein the plurality of user action parameters comprises a file name, a user name, a timestamp of each of the set of user actions, a description of each of the set of user actions, and user comments;
storing the plurality of updated code files and the plurality of user action parameters from the event corresponding to each of the plurality of updated code files in a database, wherein the database comprises a table with a column for each of the plurality of user action parameters; and
identifying at least one user action form the set of user actions as a suspicious code contribution of the user for at least one of the plurality of updated code files of the source code repository based on the plurality of user action parameters, wherein identifying the at least one user action from the set of user actions as a suspicious code contribution comprises:
for each of the plurality of updated code files,
comparing the timestamp of each of the set of user actions with a timestamp of most recent of previous actions performed on an updated code file;
establishing a user action as a suspicious code contribution when a difference between the timestamp of the user action and the timestamp of the most recent of the previous actions is below a predefined threshold and the user action is performed by a new author; and
establishing a user action as a suspicious code contribution when a difference between the timestamp of the user action and the timestamp of the most recent of the previous actions is greater than a predefined threshold.

14. The non-transitory computer-readable medium of claim 13, wherein the database further comprises:
each of the plurality of updated code files and previous versions of each of the plurality of updated code files;
a timestamp of the set of user actions performed on each of a plurality of sections of each of the plurality of updated code files; and
a timestamp of the set of user actions performed on each of a plurality of sections of each of the previous versions of the plurality of updated code files.

15. The non-transitory computer-readable medium of claim 14, wherein to identify at least of one the set of user actions as a suspicious code contribution of the user for at least one of the plurality of updated code files, the computer-executable instructions are configured for:
for each of the plurality of updated code files and for each of the plurality of sections in an updated code file,
comparing a section in the updated code file with a corresponding section in most recent of the previous versions of the updated code file, wherein a user action is performed on the section in the updated code file, and wherein the user action is a modification;
comparing a timestamp of the user action with a timestamp of most recent of previous actions performed on the corresponding section in the most recent of the previous versions of the updated code file; and
establishing the user action as a suspicious code contribution when a difference between the timestamp of the user action and the timestamp of the most recent of the previous actions is greater than a predefined threshold.

16. The non-transitory computer-readable medium of claim 13, wherein to identify at least one of the set of user actions as a suspicious code contribution of the user for at least one of the plurality of updated code files, the computer-executable instructions are configured for:
for each of the plurality of updated code files,
determining a number of the set of user actions performed by the user on an updated code file and each of previous versions of the updated code file; and
establishing a user action as a suspicious code contribution when the number of the set of user actions performed by the user is less than a predefined threshold.

17. The non-transitory computer-readable medium of claim 13, wherein the computer-executable instructions are further configured for:
initiating an alert upon identifying the suspicious code contribution of the user; and
displaying the alert on a User Interface (UI) dashboard, wherein the UI dashboard comprises a plurality of suspicious code contribution trends corresponding to each of a plurality of users, and wherein the user is one of the plurality of users.

* * * * *